(12) United States Patent
Weinberg et al.

(10) Patent No.: US 6,815,479 B1
(45) Date of Patent: Nov. 9, 2004

(54) TOUGHENED HIGH MODULUS MINERAL FILLED POLYOXYMETHYLENE POLYMERS

(75) Inventors: Mark Gary Weinberg, Wilmington, DE (US); Edmund Arthur Flexman, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/641,149

(22) Filed: Aug. 17, 2000

Related U.S. Application Data

(63) Continuation-in-part of application No. PCT/US00/04105, filed on Feb. 18, 2000.
(60) Provisional application No. 60/120,671, filed on Feb. 19, 1999.

(51) Int. Cl.$^7$ ............................. C08K 5/09; C08K 3/26; C08K 3/22; C08L 59/02; C08L 59/04
(52) U.S. Cl. ................. 524/322; 524/425; 524/497; 524/593
(58) Field of Search ................. 524/322, 425, 524/497, 601, 605, 593, 606; 523/513

(56) References Cited

U.S. PATENT DOCUMENTS

| | | | | |
|---|---|---|---|---|
| 3,926,873 A | | 12/1975 | Aishima et al. | |
| 3,969,311 A | * | 7/1976 | Kubota | 523/500 |
| 4,157,325 A | * | 6/1979 | Charles et al. | 260/40 R |
| 4,158,450 A | * | 6/1979 | Suzuki | 248/694 |
| 4,399,246 A | | 8/1983 | Hyde | |
| 4,456,710 A | * | 6/1984 | Luders et al. | 523/200 |
| 4,483,949 A | * | 11/1984 | Semen et al. | 523/514 |
| 4,698,372 A | * | 10/1987 | Moss | 521/145 |
| 4,740,538 A | * | 4/1988 | Sekutowski | 523/205 |
| 4,795,768 A | | 1/1989 | Ancker et al. | |
| 5,281,379 A | * | 1/1994 | Noguchi et al. | 264/102 |
| 5,502,099 A | * | 3/1996 | Wallace | 524/413 |
| 5,571,851 A | | 11/1996 | Freeman et al. | |
| 5,886,094 A | * | 3/1999 | Sanada et al. | 525/66 |
| 6,043,306 A | * | 3/2000 | Imahashi | 524/436 |
| 6,174,427 B1 | * | 1/2001 | Lundgard | 205/158 |

FOREIGN PATENT DOCUMENTS

| | | | |
|---|---|---|---|
| EP | 639613 A1 | * | 2/1995 |
| JP | 01170641 A | * | 7/1989 |

OTHER PUBLICATIONS

English Translation of JP 01170641 (1989).*
Wu Dacheng, Wen Wanyuan, Li Hai, Proc. Inter. Conf. Pet. Ref. and Petrochem. Proc., 2, pp 802–808 (1991), International Academic Publishers, Beijing, China.
G. Orange, 10th Int. Conf. Deformation, Yield, and Fracture of Polymers, Inst. of Mat., pp 502–505, (1997), Chameleon Press Ltd., Cambridge, UK.
Y Suetsugu, The Polymer Processing Society, 6, (1990), Nice France, Apr. 17–20.
R. H. Ottewill, J. M. Tiffany, The adsorption of long chain acids on to rutile from n–heptane, J. Oil. Col. Chem. Assoc., 50, 844–864 (1967).
Mark S. M. Alger, Polymer Science Dictionary, p 148. (1997).
Encyclopedia of Polymer Science and Engineering, 6, p 101, John Wiley & Sons. (1990).

* cited by examiner

*Primary Examiner*—Callie Shosho

(57) ABSTRACT

A composition and method for forming a hydrocarbon polymer composition of molded articles that exhibit desirable combinations of stiffness and impact resistance, wherein the composition contains a mineral filler.

10 Claims, No Drawings

TOUGHENED HIGH MODULUS MINERAL FILLED POLYOXYMETHYLENE POLYMERS

This application is a continuation-in-part of PCT/US00/04105, filed Feb. 18, 2000 which claims the benefit of U.S. Provisional Application No. 60/120,671, filed Feb. 19, 1999.

FIELD OF THE INVENTION

This invention relates to a polymer composition for molded articles exhibiting desirable combinations of stiffness and impact resistance. More particularly, this invention relates to a composition comprising an engineering polymer and a mineral filler.

TECHNICAL BACKGROUND OF THE INVENTION

So-called engineering polymers, such as polyamides, polyacetals, and polyesters, are known in the art to provide useful combinations of stiffness and toughness at room temperature and under moderate deformation rates, and are in very widespread commercial use. However, they become brittle under more extreme conditions such as the very high deformation rates associated with high impact rates such as that associated with the well known Notched Izod Impact Resistance test, ASTM D256 which is in widespread commercial use for evaluating the suitability of various polymeric materials for various practical applications. Numerous strategies have been employed to provide higher impact toughness but these have met limited success because they result in trade-offs which are often undesirable.

For example, it is known that plasticizing a semi-crystalline engineering polymer provides limited improvement in impact toughness but with a highly undesirable loss in modulus and strength. On the other hand, incorporation of glass fibers improves strength, modulus, and impact toughness, but generally results in anisotropic molded parts and undesirable levels of mold shrinkage. So-called rubber toughening is well known to improve toughness with relatively less effect on other properties but rubber toughening is expensive, increasing the cost of the resin. It is thus desirable to provide a means for improving the impact toughness of engineering polymers while minimizing the need to make those various tradeoffs.

Polyamide nylons, such as nylon 66 or nylon 6, are very well known in the art and have been in wide spread commercial use for 60 years. Nylons are condensation polymers of amines and acids or anhydrides having in common that the resulting polymer backbone contains repeating units with a nitrogen atom in the backbone.

Polyacetals are well known in the art, and are in widespread commercial use, principally in the form of polyoxymethylene homopolymer and copolymers, Polyoxymethylene homopolymer is generally formed by polymerizing formaldehyde or trioxane, the cyclic ether form of formaldehyde. Copolymers are generally formed by combining formaldehyde with various cyclic ethers such as ethylene oxide or 1,3-dioxolane to form a polymer chain having two or more methylene groups directly adjacent to one another, thereby improving the thermal stability over that of the hompolymer.

Polyesters are condensation products of a diacid and a glycol. While numerous polyesters are known in the art, polyethylene terephthalate is best known. Polyesters, like polyacetals, have polymer backbones with repeat units having oxygen atoms in the polymer backbone.

The methods of preparation for nylons, polyacetals, polyesters, and other well-known engineering polymers are described by Brydson in Plastics Materials, $5^{th}$ edition, Butterworth-Heinemann, Oxford (1991), and in the references therein provided.

Representative of the modifications to engineering polymers which are commercially available and the properties obtained are those resin grades listed in Table 1. Shown are the notched Izod impact resistance and flexural modulus of several grades of Delrin® polyoxymethylene homopolymer, Zytel® nylon 66, and Minlon® mineral-filled nylon 66, all available from the DuPont Company, Wilmington, Del. Flexural modulus was determined according to ASTM D790, and notched Izod impact resistance was determined according to ASTM D256.

TABLE 1

Commercial Resins

| Resin | Description | Flexural Modulus (ASTM D790) MPa(Ksi) | Izod Impact Resistance (ASTM D256) J/m(ft-lbs/in) |
|---|---|---|---|
| Zytel ® 101 | General Purpose | 2830 (410) | 53 (1.0) |
| Zytel ® 408L | Plasticized | 1965 (285) | 229 (4.3) |
| Zytel ® ST801 | elastomer filled | 1689 (245) | 907 (17.0) |
| Zytel ® 71G33L | 33% short glass fiber | 6900 (1000) | 128 (2.4) |
| Minlon ® 10B40 | Mineral filled nylon 66 | 8620 (1250) | 32 (0.6) |
| Delrin ® 500 | Unmodified | 3110 (450) | 76 (1.4) |
| Delrin ® 500T | Toughened | 2250 (330) | 128 (2.4) |
| Delrin ® 100ST | Toughened | 1130 (160) | 840 (16) |
| Delrin ® 525GR | glass reinforced | 8000 (1160) | 96 (1.8) |

Referring to the data in Table 1, a Zytel® 408L plasticized nylon resin exhibits a 330% improvement in impact strength but at about 230% reduction in stiffness in comparison to the general purpose Zytel® 101 resin. Plasticizers in general improve processability, but degrade numerous other mechanical properties. Elastomer filled Zytel® ST801 known as a "rubber toughened" or "super-tough" nylon composition exhibits about a 1600% improvement in toughness, but at about a 40% loss in stiffness in comparison to the general purpose. Zytel® 101 resin. Additionally, rubber toughened nylons are expensive to produce.

With continuing reference to Table 1, blending short glass fibers in a resin composition (e.g., Zytel® 71G33L and Delrin® 525GR) provides about 135% improvement in toughness and about a considerable increase in stiffness over the unmodified resins. However, glass fibers significantly reduce the moldability of the resulting resin and may lead to property anisotropy, uneven shrinkage, and part warpage. Mineral fillers provide similar improvements in stiffness to the resin but usually with a reduction in toughness, even though processibility and product isotropy are improved.

U.S. Pat. No. 4,399,246, to Hyde discloses polyamide compositions comprising 50 to 75 parts of resin, 25 to 50 parts of mineral filler, 0.2 to 0.9 parts of aminofunctional silane, and 0.2 to 0.9 parts of a sulfonamide. The mineral fillers include calcined clay, wollastonite, and talc in the size range of 0.2 to 2 micrometers. The stiffness of filled nylon 66 was 5865 MPa while Izod impact resistance was about 65 J/m.

U.S. Pat. No. 4,740,538, to Sekutowski discloses a nylon composition containing a kaolin filler precoated with an amino functional silane, the composition further containing a phenol or triethanolamine as an impact modifier.

Wu et al, Proc. Inter. Conf. Pet. Ref. and Petrochem. Proc., 2, pp 802ff (1991) discloses employing a rubber coated $CaCO_3$ to effect improvements in impact resistance of nylon 6.

U.S. Pat. No. 5,571,851 to Freeman et al. discloses an Izod impact of 42.6 J/m (0.76 ft-lbs/in) and a flexural modulus of 5620 MPa (816 ksi) when a combination of 25% stearylsilane and 75% aminosilane is incorporated into a composition of nylon 66 and calcined clay comprising 40% of calcined clay. When only the stearylsilane is employed both flexural modulus and Izod impact resistance are significantly lower.

It is known in the art to incorporate fatty acids, particularly stearic acid, into mineral filled polyolefin compositions. For example, U.S. Pat. No. 4,795,768 to Ancker et al. discloses a composition consisting of high density polyethylene filled with 50 wt-% of a 3.5 $\mu$m $CaCO_3$ pre-treated with 2% by weight of isostearic acid. Izod impact was decreased by about 8% with respect to the unfilled polymer while flexural modulus was increased by about 150%.

Orange, 10th Int. Conf. Deformation, Yield, and Fracture of Polymers, Inst. of Mat., pp. 502ff, (1997) discloses filled polypropylene compositions containing 10% by volume of a 0.1 $\mu$m and 2 $\mu$m $CaCO_3$ both stearic acid treated and untreated. The compositions containing the stearic acid treated fillers exhibited fracture toughness higher than the unfilled polymer and somewhat higher stiffness. The composition containing the 2 $\mu$m untreated filler was similar to the treated composition, but that containing the 0.1 $\mu$m untreated filler exhibited a 50% reduction in fracture toughness and about a 45% increase in stiffness.

Suetsugu, The Polymer Processing Society, (1990), discloses an increase of notched Izod impact resistance of 230% in a high molecular weight polypropylene composition containing 30% by weight of stearic acid treated 4.3 $\mu$m $CaCO_3$.

U.S. Pat. No. 3,926,873 to Aishima et al. discloses compositions comprising inorganic fillers, unsaturated carboxylic acids, and nylon 6 and nylon 66 polymers. Improvements in Izod impact resistance of less than 50% are realized while flexural modulus is increased by 50%. The process of Aishima requires a preliminary reaction step between the filler and the unsaturated carboxylic acid, followed by melt processing with the polymer in the presence of a free-radical generator.

The differences between saturated and unsaturated fatty acids in their interaction with mineral particles is disclosed in Ottewill et al., *J. Oil Colour Chemists Assn,* 50:844 (1967).

Flexman in Toughened Plastics I, C. Keith Riew and Anthony J. Kinloch, editors, American Chemical Society, Washington, 1993, shows that the fracture mechanics of polyacetals differs considerably from that of polyamides.

SUMMARY OF THE INVENTION

In one aspect of the present invention, there is provided a composition comprising an engineering polymer having a backbone comprising repeat units, at least 80 mol-% of which repeat units comprise one or more oxygen or nitrogen atoms disposed in said backbone; about 1%–30% by volume of a mineral filler having an aspect ratio of 5 or less, the filler having an average equivalent spherical diameter in the range of about 0.1 to less than about 3.5 micrometers, and a saturated organic acid, salt thereof, or a mixture thereof, at a concentration of at least about 0.5% by weight of the mineral filler.

In another aspect, the invention relates to a process for forming a composition, comprising the steps of combining a hydrocarbon polymer having a backbone comprising repeat units, at least 80 mol-% of which repeat units comprise one or more oxygen or nitrogen atoms disposed in said backbone, with a mineral filler having an aspect ratio (the average ratio of the largest to the smallest dimension of the filler particle) of less than 5, the mineral filler having an average equivalent spherical diameter in the range of about 0.1 to about 3.5 micrometers, and a saturated organic acid, salt thereof, or a mixture thereof, at a concentration of at least about 0.5% by weight of the mineral filler, the mineral filler and the hydrocarbon polymer being combined at a weight ratio given by the formula:

$$Wf/Wp=[VF/(1-VF)]\cdot Df/Dp$$

where Wf is the weight of the filler, Wp is the weight of the polymer, VF is the desired volume fraction of filler, in the range of about 0.01–0.3, Df is the density of the filler, and Dp is the density of the polymer;

heating the combination to a temperature above the melting point of the hydrocarbon polymer to form a molten composition;

mixing the molten composition to provide a homogenous melt; and, cooling the molten composition.

DETAILED DESCRIPTION

This invention, through the incorporation of saturated organic acids, salts thereof, or mixtures thereof, into compositions comprising a mineral filler and a hydrocarbon polymer having a backbone comprising repeat units, at least 80 mol-% of which repeat units comprise one or more oxygen or nitrogen atoms disposed in said backbone results in improvements in properties over the unfilled polymer and filled polymers containing impact modifiers of the art. This invention improves stiffness at constant toughness, toughness at constant stiffness, and, in certain embodiments, simultaneously improves stiffness and toughness.

Suitable for the practice of the present invention are hydrocarbon polymers having a backbone comprising repeat units, at least 80 mol-%, preferably at least 90 mol-%, most preferably at least 95 mol-%, of which repeat units comprise one or more oxygen or nitrogen atoms disposed in said backbone. Included are polyacetals, polyamides, and polyesters.

Polyacetal homopolymers, and copolymers formed from two or more aldehyde or cyclic ether monomers are suitable for the practice of the present invention including those which have been nucleated, pigmented, and otherwise modified according to practices common in the art.

Nylon 6, nylon 66, and mixtures thereof, including nylon resins which have been nucleated, pigmented, and otherwise modified, are also suitable for the practice of this invention.

Also suitable for the practice of the invention are polyesters such as polyethylene terephthalate and polybutylene terephthalate which are preferred.

The hydrocarbon polymers of this invention may include small amounts of common additives, typically less than 5% by weight, which may affect toughness or stiffness, including: stabilizers, antioxidants, mold release agents, lubricants, glass fibers, carbon black, plasticizers, pigments and other well-known additives commonly employed in the art.

Polyacetals preferred for the practice of the present invention include polyoxymethylene homopolymer, or a copolymer thereof comprising up to 10 mol-% of alkylene radical repeat units having adjacent methylene groups. Preferred copolymers include those formed by copolymerizing according to the teachings of the art formaldehyde or trioxane with cyclic ethers having 2–12 carbon atoms, preferably 1,3-dioxolane. Preferably said alkylene radical repeat units represent no more than 5 mol-%, most preferably not more than 2 mol-%, of the total polymer. Preferred polyoxymethylene copolymers are dipolymers of formaldehyde and ethylene oxide where the quantity of ethylene oxide incorporated into the polymer is about 2 weight percent, and those whose terminal hydroxyl groups have been end-capped by a chemical reaction to form ester or ether groups, preferably acetate or methoxy groups, respectively according to the teachings in U.S. Pat. No. 2,768,994, op.cit.

The preferred polymers for use in the compositions of the present invention are those with a number average molecular weight of about 20,000 to 100,000, more preferably 20,000 to 80,000 and most preferably 25,000 to 70,000.

Suitable inorganic fillers for use in this invention are those that do not have significant off-gassing or decompose at the temperatures at which the filled polymer compositions of the invention are formed and processed. These include, but are not limited to: calcium carbonate; oxides such as alumina, silica, and titanium dioxide; sulfates such as barium sulfate; titanates; kaolin clay and other silicates; magnesium hydroxide, and carbon black. In the present invention, an aspect ratio (the average ratio of the largest to the smallest dimension of the filler particle) of less than about 5 avoids stress concentrations and part anisotropies. The preferred fillers are calcium carbonate and titanium dioxide.

The size of the filler particles is stated as the equivalent spherical diameter. The equivalent spherical diameter is the diameter of a sphere having the same volume as the filler particle and may be determined by use of a Sedigraph 5100 (Micrometrics Instrument Corporation, Norcross, Ga.). The Sedigraph 5100 determines particle size by the sedimentation method, measuring the gravity-induced settling rates of different size particles in a liquid with known properties. The rate at which particles fall through the liquid is described by Stokes' Law. The largest particles fall fastest, while the smallest particles fall slowest. The sedimentation rate is measured using a finely collimated beam of low energy X-rays which pass through the sample cell to a detector. The distribution of particle mass at various points in the cell affects the number of X-ray pulses reaching the detector. This X-ray pulse count is used to derive the particle size distribution expressed as the percent mass at given particle diameters. Since particles rarely exhibit uniform shapes, each particle size is reported as an "Equivalent Spherical Diameter", the diameter of a sphere of the same material with the same speed of sedimentation.

Suitable particles have equivalent spherical diameters in the range of about 0.1 to less than-about 3.5 micrometers, most typically about 0.5–2 micrometers.

The size of the filler particles can affect the toughness and/or stiffness properties of the composition of the invention. Particles that are either too large or too small do not produce the benefits of the present invention. A suitable filler particle has a relatively narrow size distribution with particular emphasis on having a minimum number of particles much larger than the mean particle size.

It is believed that the improvements provided by the invention are related 1 to achieving a distance distribution with a mean value in the range of about 0.1 μm–about 1.0 μm; controlling of the interface between resin and filler, and maintaining continuity of the polymer phase. The nearest neighbor interparticle separation is controlled by the combination of filler size, filler loading, and adequate deagglomeration and dispersion of the filler. The polymer/filler interface is controlled by the use of sufficient but not excessive amounts of the saturated organic acids and/or salts of the invention. The continuity of the polymer phase is determined by the volume loading of filler.

The relationship among mean nearest neighbor interparticle distance (IPD), filler size, d, and required filler loading, ø (as a volume fraction), is given approximately by the equation $$IPD = d \cdot [(\pi/6\emptyset)^{1/3} - 1].$$

For example, it was found thereby that when the interparticle separation is taken to be 0.3 μm the maximum particle size cannot exceed 20 μm at volume fractions less than 0.50. When the particles occupy about 50% by volume or more, however, the continuity of the polymer matrix is jeopardized. At particle sizes at or below about 0.1 micrometer, the required interparticle separation range is readily achieved at volume loadings well-below 50% provided that the particles can be deagglomerated and homogeneously dispersed which can be very difficult to achieve because of the very high surface forces binding the fine particles together. Also, it is believed that the toughening effect observed in the practice of this invention depends upon the efficient debonding of the filler particle from the resin during impact deformation. The ability to debond decreases with particle size. It is therefore believed that at particle sizes much below 0.1 micrometers, the conditions are no longer favorable for debonding, making these particles sizes unsuitable.

It is believed that the polymer/filler interfacial forces are mediated by one or more saturated organic acids or salts thereof. The requisite amount depends upon the interfacial area—e.g., the greater the interfacial area, the more organic acid or acid salt is required. The actual amount however will depend upon the size and shape of the particles and the volume loading of the particles.

It is found that the concentration of filler varies with filler size, increasing with increasing size in the suitable range. Thus, if the filler size is at the high end of the range, a higher concentration of filler is needed than if the filler size is at the lower end of the range. The suitable range is about 1 to about 30 volume percent (vol. %), preferably about 5 to about 30 vol. %, and most preferably about 10 to about 20 vol. %. One of skill in the art, will recognize, however, that at 1% filler loadings, filled polymer compositions of the present invention will exhibit minimal improvements in stiffness or impact resistance.

At filler loadings greater than approximately 30 vol. %, it becomes increasingly difficult to achieve a homogeneous distribution of non-agglomerated filler within the polymer matrix using ordinary methods of melt mixing.

One of skill in the art will realize that the specific filler concentration range over which the present invention can be advantageously practiced will depend to some degree upon the specific interfacial interactions of a given filler and a given polymer. Thus for any given combination of ingredients it is incumbent upon the practitioner hereof to determine the specific concentration limits operative.

Suitable saturated organic acids include aliphatic carboxylic acids having about 6–30 carbon atoms optionally substituted by one or more oxygen atoms or sulfur atoms. A suitable acid may optionally contain one or more aliphatic, aromatic, or functionalized side chains. Preferred organic acids include stearic acid. Inorganic salts of the suitable acids are equally suitable, including zinc stearate and the like. It is understood by one of skill in the art that an organic acid in combination with a mineral at elevated temperatures may form a salt therewith so that the acid added to the mixture in the process of the invention may or may not be present in the final product thereof. The organic acids or salts thereof are present at a concentration of at least 0.5% by weight on the weight of the filler. While there is no particular upper limit to concentration of organic acid, in one embodiment of the invention the concentration of organic acid or salt thereof is in the range of about 0.5-to about 4% by weight on the weight of the filler.

It is believed that a useful concentration of acid or acid salt in the composition of the invention corresponds to that at which the acid or salt forms a molecular monolayer on substantially all of the mineral filler surface. Any amount less than that will exhibit less than the optimal combination of properties while any amount more than that serves no function except to dilute the amount of polymer in the composition. The addition of about 2% by weight of stearic acid on the weight of the 0.7 $\mu$m $CaCO_3$ is optimal.

The composition of the invention is formed by coating a filler with a saturated organic acid or salt thereof, mixing the coated filler into the hydrocarbon polymer suitable for use in the present invention, and pelletizing the product. The saturated organic acids or salts may be, but are not required to be, applied to the filler in a separate coating step prior to processing with polymer. In a method, known in the art, for applying organic acid or salt coatings to mineral fillers, the acid or salt is dissolved in an appropriate solvent and mixed with the filler until it is all coated. The thus coated filler can then be separated from the solution and the remaining solvent removed by drying. In another method, the acid or acid salt, the filler and the polymer are combined at once. Mixing may further be achieved by dispersing the filler into a dispersion or solution of the polymer and the organic acid or salt thereof, followed by drying. Mixing may also be achieved in the melt, either in a batch mixer or a continuous extruder.

Preferably, the ingredients are dry-blended by tumbling followed by feeding to an extruder or batch mixer according to well-established methods of the art. Alternatively, the ingredients can be separately and continuously fed to one or more extruder zones by, for example, the use of weight loss feeders, all of the mixing being performed in the extruder; or the material may be added at once or in stages to a batch type melt blender and the composition formed therein.

In one embodiment of the invention, the ingredients are processed in a twin-screw co-rotating extruder to ensure good mixing. The extrudate is pelletized and subsequently molded into parts by injection molding. The pellets can also be compression molded or a molded or extruded sheet can be thermoformed into a complex shape. Other means known in the art may also be employed to form shaped articles of the composition of the invention.

It is convenient to combine the polymer and filler according to a weight ratio determined by the respective densities thereof and the goal volume fraction of filler. The weight ratio is determined from the equation $$Wf/Wp = [VF/(1-VF)] \cdot Df/Dp$$

where Wf is the weight of the filler, Wp is the weight of the polymer, VF is the desired volume fraction of filler, in the range of about 0.01–0.5 as herein described, Df is the density of the filler, and Dp is the density of the polymer. The density, D, is not the bulk density but the actual density of the material.

The present invention is further illustrated by the following specific embodiments which are not intended to be limiting thereon.

EXAMPLES 1–40 AND COMPARATIVE EXAMPLES 1–37

In the following examples, all fillers and resins were dried at 90° C. overnight prior to dry-mixing. Melt blending was accomplished in a 28 mm co-rotating twin screw extruder (Werner & Pfleiderer, Ramsey, N.J.) at the temperatures and concentrations hereinbelow specified. The extrudate was pelletized. The extruded pellets were dried overnight at 90° C. and then processed in a 6 oz., 150 ton Van Dorn injection molding machine equipped with a water-heated mold, into dog-bone shaped tensile bars for tensile testing according to ASTM D638-95 (Type 1 specimen, 2" long gauge length; ½" wide; ⅛" thick) and flexural test bars (5" long, ½" wide, ⅛" thick).

The injection molded flexural test bars were then divided into two 2-½" long pieces, one close to the gate and referred to as the "near end" and the other far from the gate and referred to as the "far end". Notches of root radius 0.01" were cut into each part with a TMI Notching Cutter according to the process described in ASTM D256. The impact response was studied in notched Izod impact tests according to ASTM D256. Flexural testing was performed according to ASTM D790, with a cross head rate of 0.127 cm/min (0.05 inch/min). The values of the mechanical parameters determined from flexural and Izod tests were calculated as averages over measurements on at least 3 specimens. The standard deviation for Izod results was about 0.53 J/m (0.01 ft-lb/in).

In Examples 1–5, and Comparative Examples 1–17, the compounding extruder barrel temperature was 240° C., and the throughput rate was about 9.1 kg/hr (20 lbs/hour). Injection molding was conducted with a barrel temperature of 240° C. and a mold temperature of 40° C.

EXAMPLES 1–2 AND COMPARATIVE EXAMPLES 1–7

Capron 8202 nylon 6 (Allied-Signal, Richmond, Va.) was injection molded without filler in Comparative Example (Comp. Ex.) 1.

In Comparative Examples 2 and 3, Ti-Pure® R101, uncoated 0.29 $\mu$m titanium dioxide (DuPont Company, Wilmington, Del.) was melt blended with Capron 8202 at concentrations of 5 and 10 vol. %, respectively.

In Examples (Ex.) 1 and 2, 50 grams of stearic acid (SA) was mixed with 150 grams of chloroform in a beaker. 5000 grams of uncoated Ti-Pure® R-104-DD TiO$_2$ was charged into a powder mixer. The solution was added with a pipet while the TiO$_2$ (titanium dioxide) was stirred. After the addition was complete, the mixture was stirred for 3 minutes at medium speed and then dried at The stearic acid (SA) treated titanium dioxide so produced was melt blended with Capron 8202 at concentrations of 5 and 10 vol. % respectively, and molded into test bars.

In Comparative Examples 4 and 5, Ti-Pure® R104 0.22 μm titanium dioxide coated with octa-triethoxy silane (OTES) was obtained from DuPont, melt blended with Capron 8202 at concentrations of 5 and 10 vol. %, respectively, and molded into test bars.

In Comparative Examples 6 and 7, 3000 grams of uncoated Ti-Pure® R-104-DD TiO$_2$ was charged into a powder mixer. Thirty grams of 3-aminopropyl triethoxy silane was added by dropping pipet while the TiO$_2$ was stirred. After the addition was complete, the mixture was stirred for 3 minutes at medium speed. The product was then dried at 100° C. for 2 hours.

The APS treated titanium dioxide was melt blended with Capron 8202 at concentrations of 5 and 10 vol. %, respectively, and molded into test bars.

The test results in Table 2 show that the stearic acid coated particles have a surprising increase in Izod toughness as the filler volume is increased, whereas, the other examples show a decrease in Izod toughness.

TABLE 2

Properties of TiO$_2$-filled Nylon 6

| Example | Surface Treatment | Vol. % TiO$_2$ | Izod (ft-lb/in) | | Izod (J/m) | |
|---|---|---|---|---|---|---|
| | | | Near End | Far End | Near End | Far End |
| Comp. Ex. 1 | N.A. | 0 | 1.1 | 1.1 | 58.3 | 58.3 |
| Ex. 1 | SA | 5 | 1.3 | 1.3 | 68.9 | 68.9 |
| Ex. 2 | SA | 10 | 1.3 | 1.5 | 68.9 | 79.5 |
| Comp. Ex. 2 | Uncoated | 5 | 0.9 | 0.98 | 47.7 | 51.94 |
| Comp. Ex. 3 | Uncoated | 10 | 0.9 | 0.84 | 47.7 | 44.52 |
| Comp. Ex. 4 | OTES | 5 | 1.1 | 1.2 | 58.3 | 63.6 |
| Comp. Ex. 5 | OTES | 10 | 0.98 | 1.1 | 51.94 | 58.3 |
| Comp. Ex. 6 | APS | 5 | 1.1 | 1.2 | 58.3 | 63.6 |
| Comp. Ex. 7 | APS | 10 | 0.87 | 1.1 | 46.11 | 58.3 |

EXAMPLES 3–5 AND COMPARATIVE EXAMPLES 8–17

For Comparative Example 8, Capron 8200 nylon 6 was injection molded without filler. In Comparative Examples 9–11, Albafil (AF) uncoated 0.7 μm calcium carbonate (Specialty Minerals Inc., Bethlehem, Pa.) was melt blended with Capron 8200 nylon 6 (Allied-Signal, Somerville, N.J.) at concentrations of 5, 10, and 20 vol. % respectively, and injection molded into test bars.

In Comparative Examples 12–14, 1500 grams of uncoated 0.7 μm Albafil was dried at 150° C. in a vacuum oven overnight. This material was then placed into a resin kettle with 2 liters of ethanol. A separate solution of 100 grams of Zonyl-UR, a fluorosurfactant available from DuPont in 1 liter of ethanol was heated to 80° C. for 0.5 hour. The two mixtures were combined and stirred for 5 hours. The slurry so formed was allowed to settle for 3 days and then filtered with a Buchner funnel and dried overnight in an 80° C. vacuum oven.

In Comparative Examples 15–17, 1500 grams of undried, uncoated 0.7 μm Albafil was mixed with 1500 ml of hexane. A separate solution of 20 grams of APS in 500 ml of hexane was added to the Albafil dispersion and the mixture stirred for 5 hours, filtered by Buchner funnel, and dried overnight in a 100° C. vacuum oven.

In Examples 3–5, Super-Pflex 200 (S200 or SPF) stearic acid-coated 0.7 micrometer calcium carbonate was obtained from Specialty Minerals, Inc. The three thus-treated calcium carbonate compositions were melt blended with Capron 8200 nylon 6 at concentrations of each of 5 vol. %, 10 vol. %, and 20 vol. %, and all subsequently molded into test bars and the test results are provided in Table 3. The results shown in Table 3 demonstrate that S200 with a fatty acid surface coating causes a increase in Izod toughness. None of the other surface treatments on the identical CaCO3, shown in Table 3, result in the same phenomenon.

TABLE 3

Properties of CaCO$_3$-filled nylon 6

| Example | FILLER | Surface Treatment | Vol. % CaCO$_3$ | Izod (ft-lb/in) | | Izod (J/m) | |
|---|---|---|---|---|---|---|---|
| | | | | Near End | Far End | Near End | Far End |
| Comparative Example 8 | NONE | | 0 | 1 | 1.08 | 53 | 57.24 |
| Comparative Example 9 | Albafil | None | 5 | 0.6 | 0.7 | 31.8 | 37.1 |
| Comparative Example 10 | Albafil | None | 10 | 0.6 | 0.62 | 31.8 | 32.86 |
| Comparative Example 11 | Albafil | None | 20 | 0.76 | 0.81 | 40.28 | 42.93 |
| Example 3 | S200 | SA | 5 | 1.57 | 1.79 | 83.21 | 94.87 |
| Example 4 | S200 | SA | 10 | 1.81 | 2.27 | 95.93 | 120.31 |
| Example 5 | S200 | SA | 20 | 2.08 | 2.3 | 110.24 | 121.9 |

TABLE 3-continued

Properties of CaCO$_3$-filled nylon 6

| Example | FILLER | Surface Treatment | Vol. % CaCO$_3$ | Izod (ft-lb/in) Near End | Izod (ft-lb/in) Far End | Izod (J/m) Near End | Izod (J/m) Far End |
|---|---|---|---|---|---|---|---|
| Comparative Example 12 | Albafil | Zonyl-UR | 5 | 0.76 | 0.92 | 40.28 | 48.76 |
| Comparative Example 13 | Albafil | Zonyl-UR | 10 | 0.92 | 1 | 48.76 | 53 |
| Comparative Example 14 | Albafil | Zonyl-UR | 20 | 0.65 | 0.57 | 34.45 | 30.21 |
| Comparative Example 15 | Albafil | APS | 5 | 0.76 | 0.81 | 40.28 | 42.93 |
| Comparative Example 16 | Albafil | APS | 10 | 0.81 | 0.81 | 42.93 | 42.93 |
| Comparative Example 17 | Albafil | APS | 20 | 0.81 | 0.87 | 42.93 | 46.11 |

EXAMPLES 6–10 AND COMPARATIVE EXAMPLES 18–24

In Comparative Example 18, high viscosity Zytel® 42A nylon 66 (DuPont) was injection molded without filler. The three calcium carbonate fillers of different average particle sizes, listed in Table 4 were obtained from Specialty Minerals Inc. All three fillers were similarly surface treated with stearic acid. Each of the three were melt blended and molded into test bars at the concentrations shown with Zytel® 42A nylon 66 with the extruder and molding machine barrel temperatures at 270° C. and the mold temperature at 90° C. The results of Izod testing of these samples are shown in Table 4. The data of Table 4 shows that both stiffness and impact resistance are simultaneously enhanced with filler particles within a range of about 0.1 to less than about 3.5 microns. Table 4 shows that at filler sizes below this range, of 0.07 nm, and at 3.5 μm the Izod values did not increase.

TABLE 5

Properties of 0.7 μm CaCO$_3$-filled nylon 66

| Example | Vol. % Super-Pflex. 200 | Izod (ft-lb/in) Near End | Izod (ft-lb/in) Far End | Izod(J/m) Near End | Izod(J/m) Far End |
|---|---|---|---|---|---|
| Comp. Control Ex. 25 | 0 | 1.3 | 1.2 | 68.9 | 63.6 |
| Ex. 11 | 5 | 1 | 1.1 | 53 | 58.3 |
| Ex. 12 | 10 | 0.9 | 1 | 47.7 | 53 |
| Ex. 13 | 20 | 1.5 | 1.9 | 79.5 | 100.7 |
| Ex. 14 | 25 | 1.1 | 1.4 | 58.3 | 74.2 |

TABLE 4

Properties of Stearic Acid Treated CaCO$_3$-filled Nylon 66

| Example | Filler | Filler Size (μm) | Vol. % CaCO$_3$ | Izod (ft-lb/in) Near End | Izod (ft-lb/in) Far End | Izod (J/μ) Near End | Izod (J/μ) Far End | Flex Mod. (ksi) | Flex Mod MPa |
|---|---|---|---|---|---|---|---|---|---|
| Comp. Ex. 18 | None | — | 0 | 1.04 | 1.1 | 55.12 | 58.3 | 414 | 2860 |
| Ex. 6 | S200 | 0.7 | 5 | 0.8 | 0.88 | 42.4 | 46.64 | 448 | 3090 |
| Ex. 7 | S200 | 0.7 | 10 | 0.8 | 1.07 | 42.4 | 56.71 | 472 | 3260 |
| Ex. 8 | S200 | 0.7 | 15 | 1.28 | 1.74 | 67.84 | 92.22 | 506 | 3490 |
| Ex. 9 | S200 | 0.7 | 20 | 1.58 | 2 | 83.74 | 106 | 541 | 3730 |
| Ex. 10 | S200 | 0.7 | 25 | 1.6 | 1.71 | 84.8 | 90.63 | 573 | 3950 |
| Comp. Ex. 19 | UPF* | 0.07 | 5 | 0.75 | 0.8 | 39.75 | 42.4 | | |
| Comp. Ex. 20 | UPF* | 0.07 | 15 | 0.56 | 0.56 | 29.68 | 29.68 | | |
| Comp. Ex. 21 | UDF* | 0.07 | 25 | 0.4 | 0.4 | 21.2 | 21.2 | | |
| Comp. Ex. 22 | HPF** | 3.5 | 5 | 0.8 | 0.8 | 42.4 | 42.4 | | |
| Comp. Ex. 23 | HPF** | 3.5 | 25 | 0.8 | 0.8 | 42.4 | 42.4 | | |
| Comp. Ex. 24 | HPF** | 3.5 | 30 | 0.72 | 0.78 | 38.16 | 41.34 | | |

*UPF is Ultra-Pflex ®
**HPF is HiPflex ®

In Comparative Example 25, general purpose viscosity Zytel® 101 nylon 66 (DuPont) was injection molded without filler. In Examples 11–14, Super-Pflex® 200 calcium carbonate was melt blended with Zytel® 101 and the resulting composition molded into test bars similar to Examples 6–10 in Table 4 except that the mold temperature was lowered to 40° C.

EXAMPLES 15–19 AND COMPARATIVE EXAMPLES 26–32

The conditions of Examples 6–10 and Comparative Examples 18–24 described above were repeated for Examples 15–19 and Comparative Examples 26–32 with the exception that the polymer was Zytel® 132F, a nylon 66 resin (DuPont), and the concentrations were as shown in Table 6. The results with S200 show an increase in Izod toughness with increasing volume % at a filler size of 0.7 μm. Negligible increase in Izod toughness was obtained with fillers of 0.07, below the range of 0.1 to less than about 3.5, and 3.5 which is above this range.

resin then was mixed as in Comparative Examples 34 and 35. Test bars were molded with a barrel temperature of 270° C. and a mold temperature of 90° C. The data in Table 8 shows that in the presence of glass there is an improvement in izod toughness due to the addition of filler.

TABLE 6

| Example | Filler | Filler Size (μm) | Vol. % CaCO₃ | Izod (ft-lb/in) Near End | Izod (ft-lb/in) Far End | Izod (J/m) Near End | Izod (J/m) Far End |
|---|---|---|---|---|---|---|---|
| Comp. Ex. 26 | Control | | 0 | 0.75 | 0.78 | 39.75 | 41.34 |
| Comp. Ex. 27 | UPF* | 0.07 | 5 | 0.51 | 0.59 | 27.03 | 31.27 |
| Comp. Ex. 28 | UPF | 0.07 | 15 | 0.54 | 0.4 | 28.62 | 21.2 |
| Comp. Ex. 29 | UPF | 0.07 | 25 | 0.48 | 0.35 | 25.44 | 18.55 |
| Ex. 15 | S200 | 0.7 | 5 | 0.7 | 0.78 | 37.1 | 41.34 |
| Ex. 16 | S200 | 0.7 | 10 | 0.94 | 1.21 | 49.82 | 64.13 |
| Ex. 17 | S200 | 0.7 | 15 | 1.1 | 1.21 | 58.3 | 64.13 |
| Ex. 18 | S200 | 0.7 | 20 | 1.13 | 1.26 | 59.89 | 66.78 |
| Ex. 19 | S200 | 0.7 | 25 | 1.07 | 1.05 | 56.71 | 55.65 |
| Comp. Ex. 30 | HPF** | 3.5 | 5 | 0.78 | 0.67 | 41.34 | 35.51 |
| Comp. Ex. 31 | HPF | 3.5 | 15 | 0.73 | 0.75 | 38.69 | 39.75 |
| Comp. Ex. 32 | HPF | 3.5 | 25 | 0.78 | 0.73 | 41.34 | 38.69 |

*UPF is Ultra-Pflex ®
**HPF is HiPflex ®

EXAMPLES 20–25, COMPARATIVE EXAMPLE 33

Following the procedure of Examples 3–5, two grades of 0.7–1 μm Magnifin® fatty acid coated magnesium hydroxide (Lonza, Inc, Fairlawn, N.J.) were combined with Capron 8200 nylon 6. Results are shown in Table 7.

TABLE 7

Properties of MgOH-filled nylon 6

| Example | Filter | Vol. % filler | Izod Impact (ft-lbs/in) Near End | Izod Impact (ft-lbs/in) Far End | Izod Impact (J/m) Near End | Izod Impact (J/m) Far End |
|---|---|---|---|---|---|---|
| Comp. Ex. 33 | Control | 0 | 1.04 | 1.2 | 55.12 | 63.6 |
| Ex. 20 | Magnifin H-10C | 5 | 1.41 | 1.41 | 74.73 | 74.73 |
| Ex. 21 | Magnifin H-10C | 15 | 1.04 | 1.06 | 55.12 | 56.18 |
| Ex. 22 | Magnifin H-10C | 25 | 1.04 | 0.96 | 55.12 | 50.88 |
| Ex. 23 | Magnifin H-51V | 5 | 0.96 | 1.28 | 50.88 | 67.84 |
| Ex. 24 | Magnifin H-51V | 15 | 0.96 | 1.2 | 50.88 | 63.6 |
| Ex. 25 | Magnifin H-51V | 25 | 0.96 | 0.96 | 50.88 | 50.88 |

EXAMPLES 26 AND 27, COMPARATIVE EXAMPLES 34 AND 35

In Comparative Examples 34 and 35, Zytel® 101 and Zytell® 132F were each combined with Zytel® 70G643L 43% glass fiber filled nylon 66 in the feed hopper of the injection molding machine. The weight ratio was 1 part Zytel® 70G643L to 9 parts of the resin blend, to give 4.3 wt. % glass compositions. In Examples 26 and 27, the Zytel® resins were first extrusion blended with 20 vol. % Super-Pflex® 0.7 μm stearic acid treated CaCO₃, the thus blended

TABLE 8

Properties of CaCO₃-Glass Filled Nylon 66

| Example | Resin | Vol. % Filler | Izod Impact (ft-lb/in) Near Izod | Izod Impact (ft-lb/in) Far Izod | Izod Impact (J/m) Near Izod | Izod Impact (J/m) Far Izod |
|---|---|---|---|---|---|---|
| Comp. Ex. 34 | Zytel ® 101 | 0 | 0.62 | 0.7 | 32.86 | 37.1 |
| Example 26 | Zytel ® 101 | 20 | 0.78 | 0.91 | 41.34 | 48.23 |
| Comp. Ex. 35 | Zytel ® 132F | 0 | 0.7 | 0.65 | 37.1 | 34.45 |
| Example 27 | Zytel ® 132F | 20 | 0.75 | 0.89 | 39.75 | 47.17 |

EXAMPLES 28–30 AND COMPARATIVE EXAMPLE 36

In Comparative Example 36, Zytel® 101 (DuPont) nylon 66 was melt-blended at 270° C. with Capron® 8200 (Allied-Signal) nylon 6 in a 30/70 weight ratio. In Examples 28–30, Super-Pflex® 200 stearic-acid-coated calcium carbonate at 5, 10, and 20 vol. % was melt-blended with the Zytel® 101/Capron® 8200 30/70blend. All were subsequently molded into test bars. The test results are provided in Table 9. The results show an increase in Izod toughness in blends of nylon 6 and 66.

TABLE 9

| | Vol.-% Superpflex ® 200 | Izod Impact (ft-lb/in) Near End | Izod Impact (ft-lb/in) Far End | Izod Impact (J/m) Near End | Izod Impact (J/m) Far End |
|---|---|---|---|---|---|
| Comp. Ex. 36 | 0 | 1.26 | 1.34 | 66.78 | 71.02 |
| Ex. 28 | 5 | 0.88 | 1.04 | 46.64 | 55.12 |
| Ex. 29 | 10 | 0.82 | 0.72 | 43.46 | 38.16 |
| Ex. 30 | 20 | 1.53 | 1.55 | 81.09 | 82.15 |

EXAMPLES 31–33 AND COMPARATIVE EXAMPLE 37

In Comparative Example 37, Capron® 8200 nylon 6 was melt-blended with 20 vol. % of uncoated 0.7 μm Albafil® calcium carbonate. In Example 31, 1500 grams of uncoated Albafil® was mixed for 10 minutes in a V-cone blender with a solution of 15 grams of decanoic acid in 50 ml of chloroform. In Example 32, 1000 grams of uncoated Albafil® was mixed for 15 minutes in a V-cone blender with 20 grams of decanoic acid. In Example 33, 1000 grams of uncoated Albafil® was mixed for 15 minutes in a V-cone blender with 40 grams of decanoic acid. All coated particles were dried overnight in a hood and then in an oven at 100° C. for 1 hour. Both the uncoated and coated particles were melt-blended with Capron® 8200 nylon 6 to give a concentration of 20 vol. % and injection molded into bars. Table 10 shows that another saturated carboxylic acid, decanoic acid provides increased Izod toughness.

TABLE 10

| | Wt % Decanoic Acid on Albafil ® Filler | Izod Impact (ft-lb/in) | | Izod Impact (J/m) | |
|---|---|---|---|---|---|
| | | Near End | Far End | Near End | Far End |
| Comp. Ex. 37 | 0 | 0.62 | 0.81 | 32.86 | 42.93 |
| Ex. 31 | 1 | 0.55 | 0.66 | 29.15 | 34.98 |
| Ex. 32 | 2 | 0.6 | 0.63 | 31.8 | 33.39 |
| Ex. 33 | 4 | 1.57 | 1.27 | 83.21 | 67.31 |

EXAMPLES 34–37 AND COMPARATIVE EXAMPLE 37

In Comparative Example 37, Capron® 8200 nylon 6 was melt-blended with 20 vol. % of uncoated 0.7 μm Albafil® calcium carbonate. In Example 34, 1500 grams of uncoated Albafil® was mixed for 10 minutes in a V-cone blender with a solution of 15 grams of stearic acid in 50 ml of chloroform. The coated particles were dried overnight in a hood. In Example 35, 1000 grams of uncoated Albafil® was mixed for 15 minutes in a V-cone blender with 20 grams of stearic acid in 100 ml of warmed chloroform. The coated particles were dried overnight in a hood and then in an oven at 100° C. for 1 hour. In Example 36, 1500 grams of uncoated Albafil® was mixed for 10 minutes in a V-cone blender with a solution of 37.5 grams of stearic acid in 50 ml of chloroform. The coated particles were dried in an oven at 100° C. for 1 hour. In Example 37, 1000 grams of uncoated Albafil® was mixed for 15 minutes in a V-cone blender with 40 grams of stearic acid in 150 ml of warmed chloroform. The coated particles were dried overnight in a hood and then in an oven at 100° C. for 1 hour. Both the uncoated and coated particles were melt-blended with Capron® 8200 nylon 6 to give a concentration of 20 vol. % and injection molded into bars. Table 11 shows that a stearic acid concentration of about 2% on the particles was necessary to increase Izod toughness at 20 vol. % total filler. Table 11 also shows that pure stearic increased Izod toughness.

TABLE 11

| | Wt. % Stearic Acid on Albafil ® Filler | Izod Impact (ft-lb/in) | | Izod Impact (J/m) | |
|---|---|---|---|---|---|
| | | Near End | Far End | Near End | Far End |
| Comp. Ex. 37 | 0.00 | 0.62 | 0.81 | 32.86 | 42.93 |
| Ex. 34 | 1.00 | 0.53 | 0.58 | 28.09 | 30.74 |
| Ex. 35 | 2.00 | 1.89 | 2.35 | 100.17 | 124.55 |

TABLE 11-continued

| | Wt. % Stearic Acid on Albafil ® Filler | Izod Impact (ft-lb/in) | | Izod Impact (J/m) | |
|---|---|---|---|---|---|
| | | Near End | Far End | Near End | Far End |
| Ex. 36 | 2.50 | 2.21 | 2.37 | 117.13 | 125.61 |
| Ex. 37 | 4.00 | 2.08 | 2.16 | | |

EXAMPLES 38–40 AND COMPARATIVE EXAMPLE 37

In Comparative Example 37, Capron® 8200 nylon 6 was melt-blended with 20 vol. % of uncoated 0.7 μm Albafil® calcium carbonate. In Example 38, 1500 grams of uncoated Albafil® was mixed for 10 minutes in a V-cone blender with a solution of 15 grams of zinc stearate in 30 ml of toluene. The coated particles were dried in an oven at 100° C. for one hour. In Example 39, 1000 grams of uncoated Albafil® was mixed for 15 minutes in a V-cone blender with a solution of 20 grams of zinc stearate in 100 ml of chloroform. In Example 40, 1000 grams of uncoated Albafil® was mixed for 15 minutes in a V-cone blender with a solution of 40 grams of zinc stearate in 150 ml of chloroform. The coated particles in Examples 39 and 40 were dried overnight in a hood and then in an oven at 100° C. for one hour. Both the uncoated and coated particles were melt-blended with Capron® 8200 nylon 6 to give a concentration of 20 vol. % and injection molded into bars. Table 12 shows that the zinc stearate salt increased Izod toughness.

TABLE 12

| | Wt. % Zinc Acid on Albafil ® Filler | Izod Impact (ft-lb/in) | | Izod Impact (J/m) | |
|---|---|---|---|---|---|
| | | Near End | Far End | Near End | Far End |
| Comp. Ex. 37 | 0 | 0.62 | 0.81 | 32.86 | 42.93 |
| Ex. 38 | 1 | 2.07 | 2.4 | 109.71 | 127.2 |
| Ex. 39 | 2 | 1.54 | 1.49 | 81.62 | 78.97 |
| Ex. 40 | 4 | 2 | 2.1 | 106 | 111.3 |

EXAMPLES 41–43 AND COMPARATIVE EXAMPLE 38–47

In the following examples, Celcon® M270 polyacetal copolymer (Hoechst-Celanese) was melt blended with the types and concentrations of $CaCO_3$ shown in Table 13. All the fillers were obtained from Specialty Minerals Inc. The three stearic acid treated fillers were similarly surface treated. Melt blending was accomplished in a 28 mm co-rotating twin screw extruder (Werner & Pfleiderer, Ramsey, N.J.) at barrel temperatures of 220° C. The extrudate was pelletized and the pellets were dried overnight at 60° C. The dried pellets were molded into test bars in a 6 oz., 150 ton Van Dorn injection molding machine equipped with a water-heated mold. The molding machine barrel temperatures were set at 220° C. and the mold temperature was set at 60° C.

In Comparative Example 38, Celcon® M270 was extruded and injection molded without filler.

All compositions were molded into dog-bone shaped tensile bars for determination of Young's modulus according to ASTM D638-95 (Type 1 specimen, 2" long gauge length; ½" wide; ⅛" thick) and flexural test bars (5" long, ½" wide, ⅛" thick) suitable for use in the notched Izod Impact Resistance test, ASTM D256. The results are shown in Table 13.

The data of Table 13 shows that both stiffness and impact resistance are simultaneously enhanced with filler particles within a range of about 0.1 to less than about 3.5 microns. Table 13 shows that at filler sizes below this range, of 0.07 µm, and at 3.5 µm the Izod values did not increase. In addition, the Izod values did not increase with the uncoated Albafil®.

EXAMPLES 46–49 AND COMPARATIVE EXAMPLE 50,51

The methods of Example 44 were employed except that the resin was a commercially available copolymer of polyoxymethylene incorporating 1 mol-% of ethylene oxide monomer units. The resin was characterized by a number average molecular weight of 28,300 Da and a weight average molecular weight of 99,200 Da, as determined by gel permeation chromatography following the general proce-

TABLE 13

| | Filler in Celcon ® M270 | Stearic Acid Coated? | Av Particle Size (microns) | Vol. % | Izod Impact (J/m) Near End | Izod Impact (J/m) Far End | Young's Mod (MPa) | Flexural Mod (MPa) |
|---|---|---|---|---|---|---|---|---|
| Comparative. Example 38 | | | | 0 | 52.3 | 52.3 | 2852 | 2770 |
| Comparative. Example 39 | Ultra-Pflex ® | Yes | 0.07 | 5 | 46.5 | 52.3 | | |
| Comparative. Example 40 | Ultra-Pflex ® | Yes | 0.07 | 10 | 32.0 | 32.0 | | |
| Comparative. Example 41 | Ultra-Pflex ® | Yes | 0.07 | 20 | 32.0 | 32.0 | | |
| Example 41 | Super-Pflex ® 200 | Yes | 0.7 | 5 | 52.3 | 50.7 | 3094 | 3094 |
| Example 42 | Super-Pflex ® 200 | Yes | 0.7 | 10 | 56.6 | 53.9 | 3734 | 3280 |
| Example 43 | Super-Pflex ® 200 | Yes | 0.7 | 20 | 50.7 | 50.7 | 4368 | 3996 |
| Comparative. Example 42 | Albafil | No | 0.7 | 5 | 46.5 | 50.7 | | |
| Comparative. Example 43 | Albafil | No | 0.7 | 10 | 46.5 | 46.5 | | |
| Comparative. Example 44 | Hi-Pflex ® 100 | Yes | 3.5 | 5 | 49.7 | 46.5 | | |
| Comparative. Example 45 | Hi-Pflex ® 100 | Yes | 3.5 | 10 | 48.1 | 49.7 | | |
| Comparative. Example 46 | Hi-Pflex ® 100 | Yes | 3.5 | 20 | 33.6 | 33.6 | | |
| Comparative. Example 47 | Hi-Pflex ® 100 | Yes | 3.5 | 25 | 32.0 | 32.0 | | |

EXAMPLES 44, 45 AND COMPARATIVE EXAMPLES 48, 49

Delrin® 500P polyoxymethylene homopolymer was processed in the manner of Examples 41–43 except that the extruder was a 30 mm twin screw extruder. Flexural modulus was determined according to ASTM D790. Results are shown in Table 14.

TABLE 14

Polyoxymethylene homopolymer

| Example | Filler | Stearic Acid Coated | Weight % | Flexural Modulus (MPa) | Izod, (J/m) |
|---|---|---|---|---|---|
| Comparative Example 48 | | | | 2917 | 80.1 |
| Example 44 | Super-Pflex ® 200 | Yes | 10 | 3028 | 85.4 |
| Comparative Example 49 | | | | 3117 | 69.4 |
| Example 45 | Super-Pflex ® 200 | Yes | 10 | 3166 | 85.4 | dures outlined in ASTM D5296-92 employing hexafluoroisopropanol as the solvent. Results are shown in Table 15.

TABLE 15

Polyacetal Copolymer

| Example | Filler | Stearic Acid Coated | Weight % | Flexural Modulus (MPa) | Izod, (J/m) |
|---|---|---|---|---|---|
| Comparative Example 50 | | | | 2352 | 69.4 |
| Example 46 | Super-Pflex ® 200 | Yes | 10 | 2621 | 74.8 |
| Example 47 | Super-Pflex ® 200 | Yes | 20 | 2828 | 80.1 |
| Example 48 | Super-Pflex ® 200 | Yes | 30 | 3055 | 69.4 |
| Example 49 | Super-Pflex ® 200 | Yes | 40 | 3779 | 53.4 |
| Comparative Example 51 | Super-Pflex ® 200 | Yes | 50 | 4566 | 42.7 |

EXAMPLES 50–52 AND COMPARATIVE EXAMPLE 52–55

In the following examples, all resins were dried at 60° C. overnight prior to dry-mixing. Melt blending was accomplished in a 28 mm co-rotating twin screw extruder (Werner & Pfleiderer, Ramsey, N.J.) at barrel temperatures of 260° C. and concentrations hereinbelow specified in Table 16. The extrudate was pelletized. The extruded pellets were dried overnight at 60° C. and then processed in a 6 oz., 150 ton Van Dorn injection molding machine equipped with a water-heated mold, into dog-bone shaped tensile bars (Type 1 specimen, 2" long gauge length; ½" wide; ⅛" thick) and flexural test bars (5" long, ½" wide, ⅛" thick). The molding machine barrel temperatures were set at 260° C. and the mold temperature was set at 90° C. Tensile testing was performed according to ASTM D638-95 and flexural testing was performed according to ASTM D790, with a cross-head rate of 0.05 inch/min. For Izod testing, the injection molded flexural test bars were divided into two 2-½" long pieces, one close to the gate and referred to as the "near end" and the other far from the gate and referred to as the "far end". Notches of root radius 0.01" were cut into each part with a TMI Notching Cutter according to the specifications of ASTM D256. The impact response was studied in notched Izod impact tests according to ASTM D256. The values of the mechanical parameters determined from tensile, flexural and Izod tests were calculated as averages over measurements on at least 3 specimens. The standard deviation for Izod results was about 0.01 ft-lb/in.

In Comparative Example 52, Valox® 307 polybutylene terephthalate (General Electric) was extruded and injection molded without filler. In Examples 60–65, 0.07 µm Ultra-pflex® (UPF) and 0.7 µm Super-pflex® 200 (SPF) calcium carbonate were compounded as listed in Table 16. Both fillers were similarly surface treated with stearic acid. These fillers were obtained from Specialty Minerals Inc. The results of Izod testing of these samples are shown in Table 16.

EXAMPLES 53–57 AND COMPARATIVE EXAMPLE 56

The conditions of Examples 6–10 and Comparative Example 18 described above were repeated for Examples 53–57 and Comparative Example 56 with the exception that the polymer was Zytel® 159L, a nylon 612 resin (DuPont) and the extruder and injection molding machine barrel temperatures were set at 260° C. The mold temperature was again set at 90° C. The filler concentrations were as shown in Table 17.

TABLE 17

| | | | Nylon 612 | | | | | |
|---|---|---|---|---|---|---|---|---|
| | Filler | Vol % | Izod Near End (ft-lb/in) | Izod Far End (ft-lb/in) | Izod Near End (J/m) | Izod Far End (J/m) | Flex Mod (Kpsi) | Flex Mod (MPa) |
| Comp. Ex. 56 | Control | 0 | 0.86 | 0.94 | 45.9 | 50.2 | 274.7 | 1894 |
| Ex. 53 | Super-Pflex ® 200 | 5 | 0.94 | 0.86 | 50.2 | 45.9 | 299 | 2062 |
| Ex. 54 | Super-Pflex ® 200 | 10 | 0.73 | 0.81 | 39.0 | 43.3 | 330.5 | 2279 |
| Ex. 55 | Super-Pflex ® 200 | 15 | 0.78 | 0.7 | 41.7 | 37.4 | 371.3 | 2561 |
| Ex. 56 | Super-Pflex ® 200 | 20 | 0.7 | 0.7 | 37.4 | 37.4 | 375.8 | 2592 |
| Ex. 57 | Super-Pflex ® 200 | 25 | 0.54 | 0.57 | 28.8 | 30.4 | 459.6 | 3170 |

What is claimed is:

1. A composition comprising (a) a polymer comprising at least 95 mol-% of oxymethylene repeat units; (b) about 1%–30% by volume of a mineral filler having an aspect ratio of 5 or less, the filler having an average equivalent spherical diameter in the range of about 0.1 to less than about 3.5 micrometers; and (c) a saturated organic acid, salt thereof, or a mixture thereof, at a concentration of at least about 0.5% by weight of the mineral filler.

2. The composition according to claim 1 wherein the composition comprises about 5–30% by volume of a mineral filler.

3. The composition according to claim 1 wherein the composition comprises about 10–20% by volume of a mineral filler.

4. The composition of according to claim 1 wherein the average equivalent spherical diameter is about 0.5 to about 2 micrometers.

TABLE 16

| | | Polybutylene Terephthalate | | | | | |
|---|---|---|---|---|---|---|---|
| Example | Filler | Particle Size (µm) | Vol. % Filler | Izod Impact (J/m) Near End | Izod Impact (J/m) Far End | Flexural Mod (MPa) | Youngs Modulus (MPa) |
| Comparative Example 52 | | | 0 | 26.5 | 31.8 | 2591 | 2633 |
| Comparative Example 53 | UPF ® | 0.07 | 5 | 31.8 | 31.8 | | |
| Comparative Example 54 | UPF ® | 0.07 | 10 | 15.9 | 21.2 | | |
| Comparative Example 55 | UPF ® | 0.07 | 20 | 15.9 | 15.9 | | |
| Example 50 | SPF ® 200 | 0.7 | 5 | 31.8 | 31.8 | 2902 | 3047 |
| Example 51 | SPF ® 200 | 0.7 | 10 | 26.5 | 26.5 | 3268 | 3317 |
| Example 52 | SPF ® 200 | 0.7 | 20 | 26.5 | 26.5 | 4001 | 4063 |

5. The composition according to claim 4 wherein the saturated organic acid is stearic acid at a concentration of about 2% by weight on the weight of the filler.

6. The composition according to claim 1 wherein the concentration of saturated organic acid, salt thereof, or mixture thereof is in the range of about 0.5–4% by weight.

7. The composition according to claim 1 wherein the saturated organic acid, salt thereof, or mixture thereof comprises one or more saturated fatty acids, salts thereof, or a mixture thereof.

8. The composition according to claim 7 wherein the saturated fatty acid is stearic acid.

9. The composition according to claim 1 wherein the mineral filler is calcium carbonate or titanium dioxide.

10. A molded article comprising the composition of claim 1.

* * * * *